April 5, 1932.   F. L. MORSE   1,852,536
DRIVE CHAIN
Filed Aug. 17, 1928
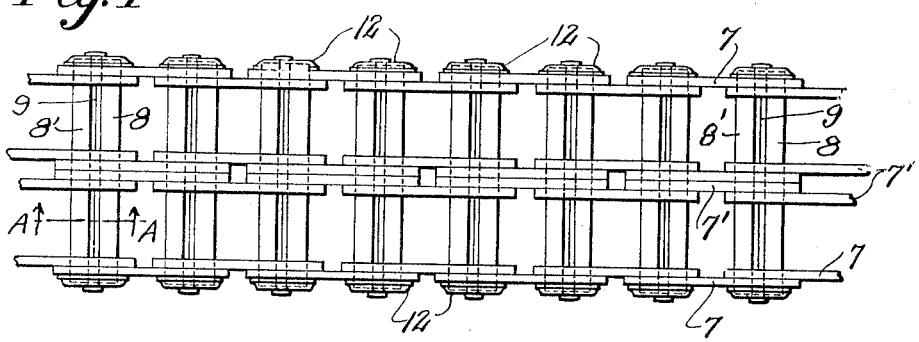
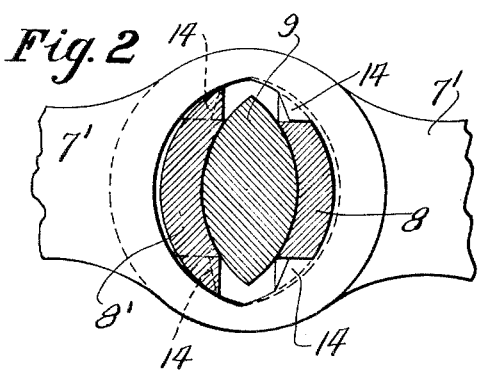
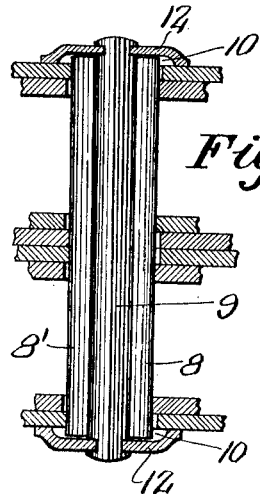
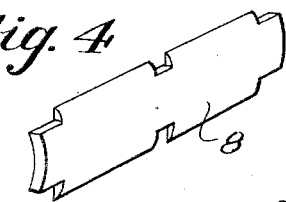
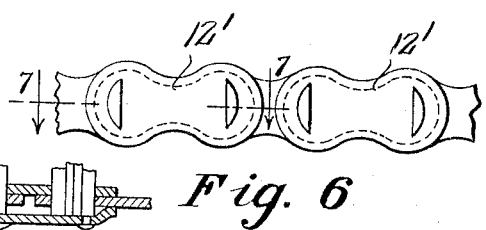
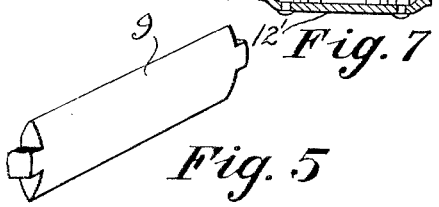
FRANK L. MORSE INVENTOR
BY
Synnestvedt & Lechner
ATTORNEYS.

Patented Apr. 5, 1932

1,852,536

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

DRIVE-CHAIN

Application filed August 17, 1928. Serial No. 300,169.

This invention relates to chains used in the transmission of power, and particularly to an improved chain in which the link plates are prevented from slipping or riding over the ends of the bushings or pintle parts of the chain. A common form of failure in chains is due to a pinching or crushing of some of the pintle parts at their ends where side link plates bear upon them. The side links then tend to slip off the end and jam between the pintle and another side link plate, or between link plate and washer.

The primary object of the present invention is the provision of a chain in which such difficulties are overcome.

How the foregoing, together with such other objects as may hereinafter appear, or are incident to my invention, are realized, is illustrated in the accompanying drawings, wherein Fig. 1 is a plan view showing by way of example the improvement as applied to a multi-strand chain.

Fig. 2 is an enlarged cross-section on the line A—A of Fig. 1.

Fig. 3 is a plan view with the pintle parts in elevation and the link plates and washers in cross-section, showing how the pintle parts are extended thru and beyond the side link plates.

Fig. 4 is a perspective view illustrating one of the pintle parts.

Fig. 5 is a perspective view illustrating another pintle part.

Fig. 6 illustrates a modification.

Fig. 7 is a fragmentary plan section taken on the line 7—7 of Fig. 6.

Referring now to Figs. 1, 2 and 3, the chain is composed of link plates 7, 7′ and pintle parts 8, 8′, and 9, which extend across the chain thru holes in the link plates 7, 7′ and may be engaged by sprocket teeth in the usual manner. In the chain selected by way of illustration a three part pintle is used, including a convex central member 9, shown in detail in Fig. 5, and a pair of concave bushing plates 8, 8′ cooperating therewith. Various other forms of joint however might be used. The invention is also applicable to chains of the form in which the link plates extend for the full width of the chain and are provided with sprocket engaging teeth.

It has not been uncommon in various forms of chains for the link plates at the outside ends of the bushings to work off the ends of the bushing, or wedge and crush the metal at the ends of the bushings. To overcome this difficulty I have extended the pintle parts 8, 8′, 9 not only entirely thru the outside link plates 7, but a substantial distance beyond, as clearly indicated in Fig. 3 by the reference numeral 10. When the chain is under tension the pressure of the side link plates 7 upon the pintle parts 8, 8′ does not fall on the extreme ends of the pintle parts, but comes a sufficient distance in so that there is no tendency for them to ride off. This strengthens the chain considerably, as the point of application of the load is sufficiently far in so that the metal of the pintle part is well supported.

In order to permit this extension of the pintle parts the outside washers or plates 12 or 12′ are dished or bent over to hold the chain together, while allowing room for the ends of the pintle parts. One of the pintle parts, as for example the central member 9 in Fig. 3, or one of the bushing plates 8 or 8′ in Fig. 6, is extended thru the washer 12 or side plate 12′ and riveted thereto, thus holding the chain parts securely in place. The link plates 7, 7′ may be keyed into the pintle parts 8, 8′ by projections 14 as shown in Fig. 2 or by other suitable means. While I have in the foregoing shown the improvement applied to a ladder chain of the three part pintle type, the invention is also applicable to single strand chains, as well as to chains of two, three or more strands, and also to two part pintles, and pintles of various other types, as will be apparent to those skilled in the art.

What I claim is:

1. In a power transmission chain of the silent type, the combination of side link plates, multi-part pintles the parts of which extend through and beyond the outer side link plates, and dished side members for retaining the link plates and pintle parts in operative association, said extended portions of the pintle parts extending into the dished side members and providing support for the outside link plates as said plates lengthwise of the pintles in service.

2. In a power transmission chain of the silent type, the combination of link plates, multi-part pintles for joining the link plates, said pintles being of a length substantially exceeding the width of the chain bounded by the link plates and cupped washers carried by one part of each pintle for retaining the link plates and pintle parts in operative association, the other parts of said pintles extending into the cupped washers and said extending portions providing support for the outside link plates of the chain as said plates move lengthwise of the pintles in service.

3. A drive chain comprising in combination, a series of links composed of plates, multi-part pintles for joining the links, the parts of said pintles being substantially longer than the width of the chain from one outside link plate to the opposite outside link plate so that substantial portions of the pintle parts extend beyond the outside link plates at each side of the chain and dished side members into which said portions extend for retaining the link plates and pintle parts in operative association, said portions providing support for the outside link plates as said plates move lengthwise of the pintles in service.

In testimony whereof I have hereunto signed my name.

FRANK L. MORSE.